United States Patent [19]

Seité et al.

[11] 3,942,491
[45] Mar. 9, 1976

[54] ELECTRONIC IGNITION SYSTEM FOR INTERNAL COMBUSTION ENGINE

[75] Inventors: Guy Seité; Michel Gauthier, both of Paris, France

[73] Assignee: Compteurs Schlumberger, Montrouge, France

[22] Filed: Jan. 7, 1974

[21] Appl. No.: 431,540

[52] U.S. Cl.............................................. 123/117 R
[51] Int. Cl.². ........................................... F02P 5/04
[58] Field of Search ......... 123/148 E, 117 R, 146.5, 123/32 EA

[56] References Cited
UNITED STATES PATENTS

| | | | |
|---|---|---|---|
| 3,454,871 | 7/1969 | Nolting............................ | 123/117 R |
| 3,689,753 | 9/1972 | Williams.......................... | 123/117 R |
| 3,696,303 | 10/1972 | Hartig.............................. | 123/148 E |
| 3,738,339 | 6/1973 | Huntzinger...................... | 123/148 E |
| 3,749,073 | 7/1973 | Asplund........................... | 123/117 R |
| 3,752,139 | 8/1973 | Asplund........................... | 123/117 R |
| 3,757,755 | 9/1973 | Carner............................. | 123/117 R |
| 3,835,819 | 9/1974 | Anderson......................... | 123/117 R |

*Primary Examiner*—Wendell E. Burns
*Assistant Examiner*—Ronald B. Cox
*Attorney, Agent, or Firm*—William R. Sherman; Stewart F. Moore

[57] ABSTRACT

The crankshaft bears a mark which passes in front of a sensor. When the crankshaft is rotated as the engine turns, the sensor delivers a squarewave signal when this mark passes in front of it. The mark and the sensor are positioned with respect to each other such that when the end of the mark passes in front of the sensor the piston is in a given low position and moves up toward the spark plug and such that when the other end of the mark passes in front of the sensor, the piston has substantially reached its maximum stroke within the cylinder in the vicinity of the spark plug, i.e. when it produces the maximum compression of the combustion gases located in the cylinder. The output of the sensor is connected to the input of a reset circuit of a counter and to the input of a count start and stop circuit of this counter and also to the input of a transfer control circuit. The count input of the counter is connected to the output of a pulse generator, such as a clock, for example, delivering pulses at a given constant frequency. The output of the counter is connected to the input of a buffer memory whose control input is connected to the output of the transfer control circuit. The output of the buffer memory is connected to the input of a permanent memory whose function will be explained further below. The output of the permanent memory is connected to a first input of a binary comparator whose other input is connected to the output of the counter. The output of the binary comparator is connected to the input of the ignition system, i.e. the spark plug. This connection, shown in a dotted line, can be achieved, for example, by an amplifier or any other electronic system making it possible, from an electric pulse delivered by a binary comparator, to produce between the electrodes of the spark plug a spark with a sufficient energy to produce the combustion of the combustion gases contained in the cylinder.

19 Claims, 7 Drawing Figures

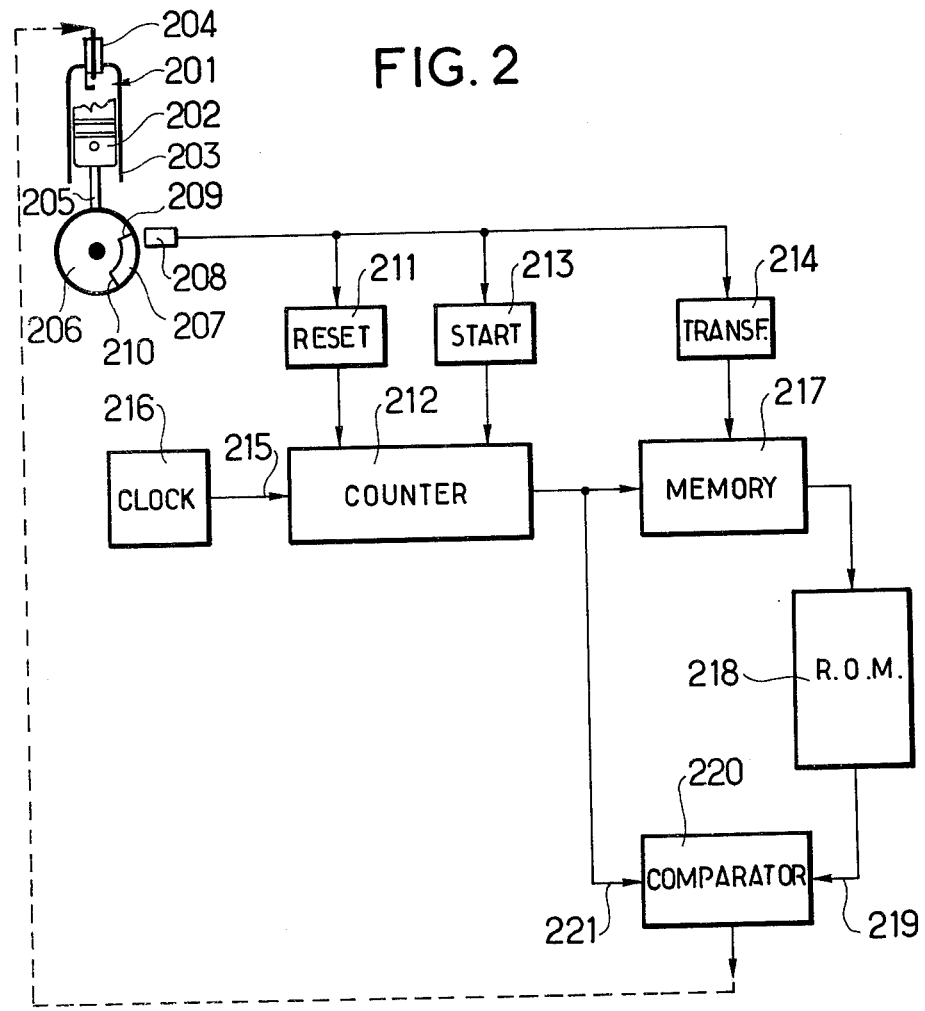

ELECTRONIC IGNITION SYSTEM FOR INTERNAL COMBUSTION ENGINE

BACKGROUND OF THE INVENTION

This invention relates to electric pulse generating methods and apparatus for the ignition systems of internal combustion engines having at least one piston moving within a cylinder and more particularly to such apparatus making it possible to obtain an automatic ignition advance.

An internal combustion engine, in particular for automobiles, includes at least one cylinder in which a piston moves. On the wall of the cylinder are fixed an inlet for a gas mixture consisting of a comburent and a fuel, an ignition system making it possible to obtain the combustion of the two gases and an exhaust manifold for removing the burnt gases. The ignition system generally consists of a spark plug which can produce electric sparks between two electrodes, these sparks achieving the ignition of the combustion gases.

The piston of the motor is driven reciprocatingly or, even rotatingly in certain cases, within a cylinder to compress the combustion gases which, after compression, are burnt by means of the spark produced between the two electrodes of the spark plug. The combustion of the gases makes it possible to drive back the piston. The reciprocating motion of the piston is maintained under the reaction of the combustion of the gases and by the inertia of the moving mass and, in particular, of a crankshaft to which the piston is connected through a connecting rod. By means of a take-off from this crankshaft, it is possible, for example, to drive the wheels of an automotive vehicle.

It is known that, in an internal combustion engine, in order to obtain maximum efficiency, it is necessary for the ignition of the combustion gases to take place at low rotating speeds of the crankshaft, when the combustion gases are under maximum compression, i.e. when the piston is in the so-called "top dead center", that is when it is substantially in the position at which its speed of translation is cancelled and reversed and at which it determines, in the cylinder, the smallest volume. On the other hand, for higher crankshaft rotating speeds, the ignition of the gases must take place before these gases are under maximum compression, i.e. before the piston reaches its top dead center. The higher the engine rotating speed, the earlier must be the ignition of the gases before the piston reaches the top dead center.

The aforesaid conditions determine the adjustment of the ignition advance for an internal combustion engine.

At the present time, most automotive vehicles have a mechanical ignition advance adjustment. There are vehicles on the market in which the ignition advance adjustment is done in a fully electronic manner. Different devices and methods are known for the generation of electric pulses for the ignition systems of internal combustion engines.

None of the presently known electronic devices for ignition advance adjustment gives full satisfaction because they are either too complex or designed only for particular types of internal combustion engines, or, as is often the case, they are too voluminous and costly.

It is an object of the present invention to provide electric pulse generating apparatus for the ignition system of internal combustion engines making it possible to obtain a low-cost automatic ignition advance adjustment of simple design and, especially, of much smaller size than those of the prior art owing to the almost exclusive use of integrated circuits.

SUMMARY OF THE INVENTION

In accordance with one feature of the invention, a method is provided for generating electric pulses for the ignition system of an internal combustion engine having at least one piston moving in a cylinder. This method consists of:

generating a number of pulses which is a function of the movement of said piston in one direction in said cylinder between a first and second given position, and of delivering an electric pulse after a period of time which is a function of said number of pulses, this period of time originating the instant the piston passes again, in the same direction, through said first given position.

According to a further feature of the invention, apparatus is provided for generating electric pulses for the ignition system of an internal combustion engine having at least one piston moving within a cylinder, enabling the implementation of the above-described method, said apparatus consisting of:

a piston position detector delivering a signal representative of a number of pulses while the piston moves in one direction in said cylinder between a first and second given position, and a so-called ignition-pulse generator controlled by said detector, delivering an electric pulse after a period of time which is a function of said number, this period of time originating the instant the piston passes again in the same direction into said first given position, said electric ignition pulse enabling the control of the ignition system of the engine.

BRIEF DESCRIPTION OF THE DRAWINGS

For a better understanding of the invention together with further objects and advantages thereof, reference will be made to the following description and to the accompanying drawings in which:

FIG. 1 is a schematic representation of the block diagram of apparatus according to the invention;

FIGS. 2, 3, 4, 5 and 6 represent five embodiments of apparatus according to the invention.

DESCRIPTION OF THE PREFERRED EMBODIMENT

Figure 3:
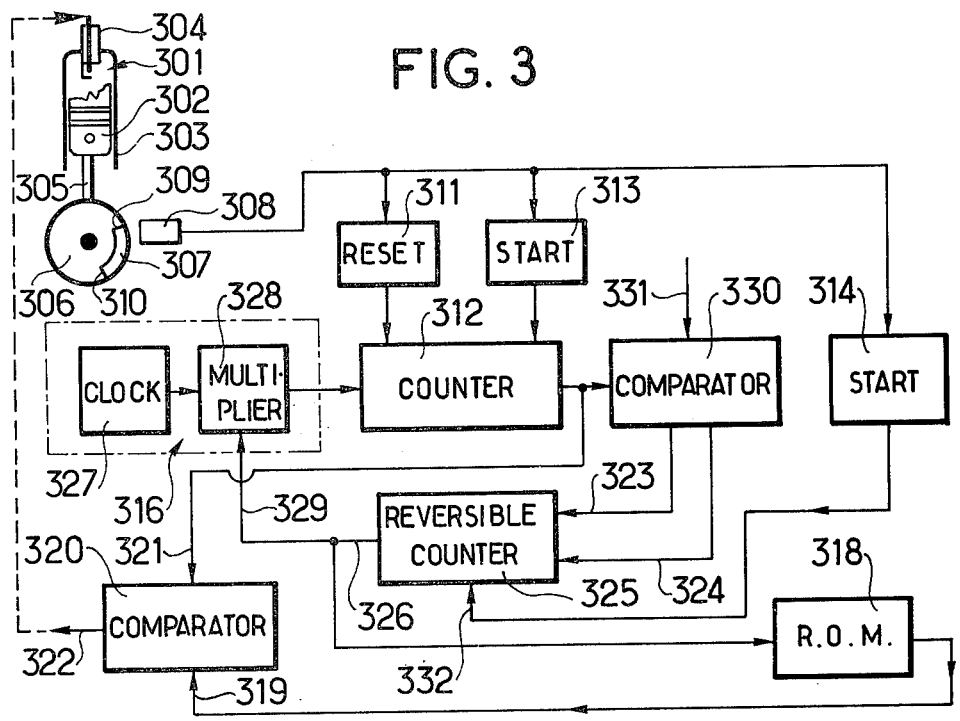

FIG. 1 represents very schematically an electric pulse generating apparatus for the ignition system of an internal combustion engine 101 making it possible in addition to automatically obtain the ignition advance in accordance with the rotating speed of the engine.

In the following description, it will be assumed that this internal combustion engine includes at least one piston moving reciprocatingly within the cylinder, but it is quite evident that the apparatus could also be applied, for example, to a rotary engine in which the piston is replaced by a component to which is imparted a rotating movement within a cylinder.

The apparatus includes, in combination with the engine 101, a detector 102 making it possible to detect the position of the piston of the engine 101 moving in its cylinder. The detector delivers a number of pulses at its output while the piston moves in one direction within the cylinder between a first and second given position, the first position being a low position while the second is generally defined substantially by the position of the top dead center. The output of the detector 102 is connected to the control input of an ignition pulse generator 103. This generator 103 delivers an electric ignition pulse at its output after a period of time which is a function of the number of pulses delivered by the detector 102. This period of time moreover originates the instant the piston passes again in the same direction through the same first given position, advantageously during the next passage. The pulse thus delivered at the output of the pulse generator 103 is applied to the control input of the ignition system of the engine 101 which generally consists of a spark plug. The electric pulse applied to the spark plug makes it possible to obtain between its two electrodes an electric spark whose energy is sufficient to achieve the ignition of the combustion gases in the engine.

FIG. 2 represents a more detailed embodiment of an apparatus in conformity with that shown schematically in FIG. 1 enabling the generation of electric pulses for an ignition system of an internal combustion engine 201. The engine 201 illustrated very schematically comprises a piston 202 moving in a cylinder 203 on the wall of which is placed an ignition device such as a spark plug 204, for example. The piston 202 moves reciprocatingly within the cylinder and drives, through a connecting rod 205, a flywheel or crankshaft 206. This crankshaft 206 bears a mark 207 which passes in front of a sensor 208. When the crankshaft is rotated as the engine turns, the sensor 208 delivers a squarewave signal when this mark passes in front of it. The mark 207 and the sensor 208 are positioned with respect to each other such that when the end 209 of the mark 207 passes in front of the sensor 208 the piston 202 is in a given low position and moves up toward the spark plug 204 and such that when the other end 210 of the mark 207 passes in front of the sensor 208, the piston 202 has substantially reached its maximum stroke within the cylinder in the vicinity of the spark plug 204, i.e. when it produces the maximum compression of the combustion gases located in the cylinder 203. The output of the sensor 208 is connected to the input of a reset circuit 211 of a counter 212 and to the input of a count start and stop circuit 213 of this counter 212 and also to the input of a transfer control circuit 214. The count input 215 of the counter 212 is connected to the output of a pulse generator 216, such as a clock, for example, delivering pulses at a given constant frequency. The output of the counter 212 is connected to the input of a buffer memory 217 whose control input is connected to the output of the transfer control circuit 214. The output of the buffer memory 217 is connected to the input of a permanent memory 218 whose function will be explained further below. The output of the permanent memory 218 is connected to a first input 219 of a binary comparator 220 whose other input 221 is connected to the output of the counter 212. The output 222 of the binary comparator 220 is connected to the input of the ignition system, i.e. the spark plug 204. This connection, shown in a dotted line, can be achieved, for example, by an amplifier or any other electronic system making it possible, from an electric pulse delivered by a binary comparator, to produce between the electrodes of the spark plug 204 a spark with a sufficient energy to produce the combustion of the combustion gases contained in the cylinder 203.

The sensor 208, like those which will be described subsequently, can consist, for example, of a photocell detecting a dark area on the crankshaft 206, this dark area being delimited by two ends 209 and 210. However, this sensor can be advantageously made up of a high-frequency induction type proximity sensor enabling the detection of the passage of a conducting material, this detector being based upon the variations in the overvoltage coefficient of an induction coil in which a high-frequency current flows. The variations in the overvoltage coefficient are used to modify the oscillation amplitude of a resonant-circuit type oscillator whose inductance constitutes the induction coil, so that, after filtering the signals obtained at the terminals of the coil, it is possible to obtain a squarewave signal.

The permanent memory 218 is a known type of element and is of integrated circuit design. It makes it possible, in accordance with a signal corresponding to a binary number which is applied to its input, to deliver at its output a signal corresponding to another binary number in accordance with a predetermined correspondence law. At each rotating speed of the engine one determines a pulse number N which is a function of this speed and which is placed in correspondence with a number N' making it possible to determine the ignition order for this rotating speed. By way of example, if for a given speed a number N is determined which has a weight of one hundred pulses, i.e. the number of pulses counted from the time the piston passes through the low position until it reaches the high position and if N' has a weight of 80 pulses, it will be sufficient to count 80 pulses as of the instant the piston passes again through its low position, using as a reference the pulses at the same frequency as those which served to determine N. At the 80th pulse, an electric pulse will be generated to control the ignition of the engine.

Thus specified, the operation of the device according to FIG. 2 is as follows:

The detector 208 delivers at its output a squarewave signal whose duration is determined by the successive passages of the two ends 209 and 210 of the mark 207 in front of the sensor 208. The duration of the squarewave signal is a function of the translation speed of the piston 202 when it moves between the two given positions, i.e. between the low position and the top dead center. The leading edge of the squarewave signal makes it possible, through the circuit 211, to reset the counter 212 which then begins to count the pulses delivered by the generator 216.

The counter thus supplied by the generator 216 counts a number of pulses N until the trailing edge of the squarewave signal, through the circuit 213, determines the stopping of the counting in the counter 212. The counter has thus recorded a number of pulses N which is a function of the duration of the squarewave signal delivered by the sensor 208. This number of pulses N is stored in the buffer memory 217. This transfer is controlled by the circuit 214 on the trailing edge of the squarewave signal delivered by the detector 208. As the engine continues to rotate, the sensor delivers a second squarewave signal when the mark 207 passes in front of it. Thus, the counter records another number N of pulses which corresponds to the speed of the engine during this measurement. In the interval of time between two squarewave signals and the time of a squarewave signal following this interval, the number recorded in the buffer memory 217 is applied to the input of the permanent memory 218 which establishes a correspondence between this number N and the number N' which corresponds to the ignition control order of the engine. Thus, when the squarewave signal following this interval is delivered by the sensor 208, the counter 212 begins to count as of the beginning of the squarewave signal.

When the counter 212 delivers a signal which corresponds to the binary number equal to N', the comparator 220, receiving on its other input the number N' delivered by the permanent memory, then delivers at its output 222 an electric pulse which is sent, via suitable means, to the ignition system of the engine. Of course, in order for the apparatus to give full satisfaction, it is necessary to assume that the variations in the engine speed are relatively small from one measurement to the other, since the ignition of the engine is controlled by preceding information.

The apparatus described above, with reference to FIG. 2, is a relatively simple embodiment, but it has some drawbacks. In fact, it is evident that the higher the engine speed the lower the duration of the squarewave signal delivered by th sensor and, hence, the smaller the number N of pulses counted by the counter 212. In fact, the number N is inversely proportional to the rotating speed of the engine. Under these conditions, in particular for high speeds, it is necessary for the counter to record a relatively high number of pulses, which consequently implies that, for low rotation speeds, the number N is very high. Moreover, as the number N is inversely proportional to the speed, the permanent memory, which is prerecorded, must have a high capacity and it is then very complex and very costly. A disadvantage of this apparatus is that the variable N at the input of the permanent memory and the variable N' at the output do not vary in proportion to the parameter of the engine speed and ignition angle respectively. It is thus not easy to offset the ignition order in accordance with the engine speed or the position of the piston when the ignition is to take place.

FIG. 3 represents another embodiment of an apparatus allowing the generation of electric pulses for the ignition system of an internal combustion engine, making it possible in particular to overcome the drawbacks of the apparatus according to FIG. 2 and to use, for example, a permanent memory of smaller capacity than that necessary in the embodiment as illustrated in FIG. 2 and consequently of a much lower cost.

The engine 301 includes a piston 302 moving within a cylinder 303 having, at its upper part, an ignition system such as a spark plug 304. The piston is integral with a connecting rod 305 imparting a rotating movement to a crankshaft 306 bearing, on its periphery, a mark 307 passing in front of a sensor 308. The sensor 308 delivers, at its output, a squarewave signal whose leading edge corresponds to the passage of the end 309 of the mark 307 in front of the detector 308 and whose trailing edge corresponds to the passage of the end 310 of the mark 307 in front of this same sensor.

The squarewave signal delivered by the detector makes it possible to obtain a measurement of the translation time of the piston when it moves between the two given positions. The output of the sensor 308 is connected to the input of a reset circuit 311 of a counter 312. The output of the sensor 308 is also connected, via a count stop circuit 313, to the counter 312. The count input of the counter 312 is connected to the output of a pulse generator 316 capable of delivering variable-frequency pulses in accordance with a control order applied to it on its control input 329. This pulse generator 316 can consist, for example, of a generator 327 delivering pulses at a set frequency and the output of which is connected to the count of a frequency multiplier 328, the output of this multiplier being connected to the count input of the counter 312. The output of the counter 312 is connected to a first input of a binary comparator 330 whose other input is capable of receiving a constant set-point signal which will hereinafter be called the number M. The outputs of the binary comparator 330 are connected respectively to the two inputs 323 and 324 of an add-subtract unit 325 whose output 326 is connected to the control input 329 of the pulse generator 315. The control input 332 allowing the adding or subtracting of the add-subtract unit 325 is connected to the detector 308 through a count authorization circuit 314. Finally, the output of the counter 312 is connected to a first input 321 of a binary comparator 330 whose other comparison input 319 is connected to the output of a permanent memory 318 whose input is connected to the output 326 of the add-subtract unit 325. The output 322 of the binary comparator 320 can thus be connected to the ignition system 304 of the internal combustion engine 301 preferably through amplification devices in order to obtain a spark having a sufficient energy to produce the ignition of the combustion gases which are compressed by the piston in the cylinder 303.

The operation of the apparatus according to FIG. 3 is as follows:

The sensor 308 delivers successive squarewave signals. The leading edge of each squarewave signal corresponds to a first given low position of the piston 302, and the trailing edge corresponds substantially to the position of the top dead center of the piston 302 in the cylinder 303. The leading edge of the squarewave signal makes it possible, through the reset circuit 311, to reset the content of the counter 312 which, immediately after resetting, begins to count the pulses delivered by the pulse generator 316.

The pulses delivered at the output of the generator 316 are obtained from pulses delivered by the generator 327 delivering fixed-frequency pulses which are then multiplied in the multiplier 328 by a number which we shall call λ and which is obtained at the output of the add-subtract unit 325. The counting in the counter 312 is stopped on the trailing edge of the squarewave signal through the stop circuit 313. The content M' of the counter 312 is compared with the predetermined number M in the binary comparator 330 in accordance with the value of these two numbers M' and M. The add-subtract unit readjusts the value λ so that the number of pulses N obtained at the output of the generator 327 multiplied by this number λ in the multiplier 328 determines a new number M' which is as close as possible to the number M.

It is seen that throughout the duration of a squarewave pulse delivered by the sensor 308, the generator 327 has delivered a number N of pulses which, multiplied by the number λ, has given a number substantially equal to M which is constant. If the number M' is not equal to the number M, the add-subtract unit 325 makes it possible to vary the value of λ by one unit more or less between each squarewave signal delivered by the sensor 308.

In this case, it is seen that the number λ obtained at the output of the add-subtract unit 325 is proportional to the rotating speed of the engine since λ N equals M.

It is consequently easy to determine, in this case with a permanent memory, the number N' as a function of the value λ which is itself proportional to the speed of the engine. Thus, the signal corresponding to the number λ obtained at the output 326 of the add-subtract unit 325 is sent to the input of the permanent memory 318 which delivers at its output the binary signal representing the number N'. This signal corresponding to N' is applied to the input of the binary comparator 320. When the output of the counter 312 delivers a signal corresponding to the signal determining the number of pulses equal to N' while the sensor delivers the squarewave signal following the one which enables the determination of the value of λ, the comparator 320 then delivers at its output 322 a pulse which allows the control of the ignition system of the engine. The main advantage of the apparatus illustrated in FIG. 3 is that the permanent memory is of a much smaller capacity than that necessary with the embodiment of the apparatus as shown in FIG. 2, the number λ being proportional to the speed.

The operation of the apparatus has been described above in the case where the fixed-frequency generator is followed by a frequency multiplier to obtain a number λ inversely proportional to the number N, i.e. proportional to the rotating speed of the engine. The operation of the embodiment of the apparatus would be substantially the same if the fixed-frequency generator were followed by a frequency divider.

Nevertheless, this embodiment of the apparatus operates correctly only if the engine speed variations are not too great, because with the add-subtract unit 325, the number λ can vary only by one unit more or less between each squarewave signal. In the case where there is a possibility that the engine speed variations will be greater, the embodiment of the apparatus shown schematically in FIG. 4 allows this possibility, which was not the case with the embodiment of the apparatus according to FIG. 3. With the embodiment according to FIG. 4, the number λ is calculated more closely and varies by more than one unit, since, for each measurement, one calculates its true value in accordance with the information contained in the counter.

Figure 4:
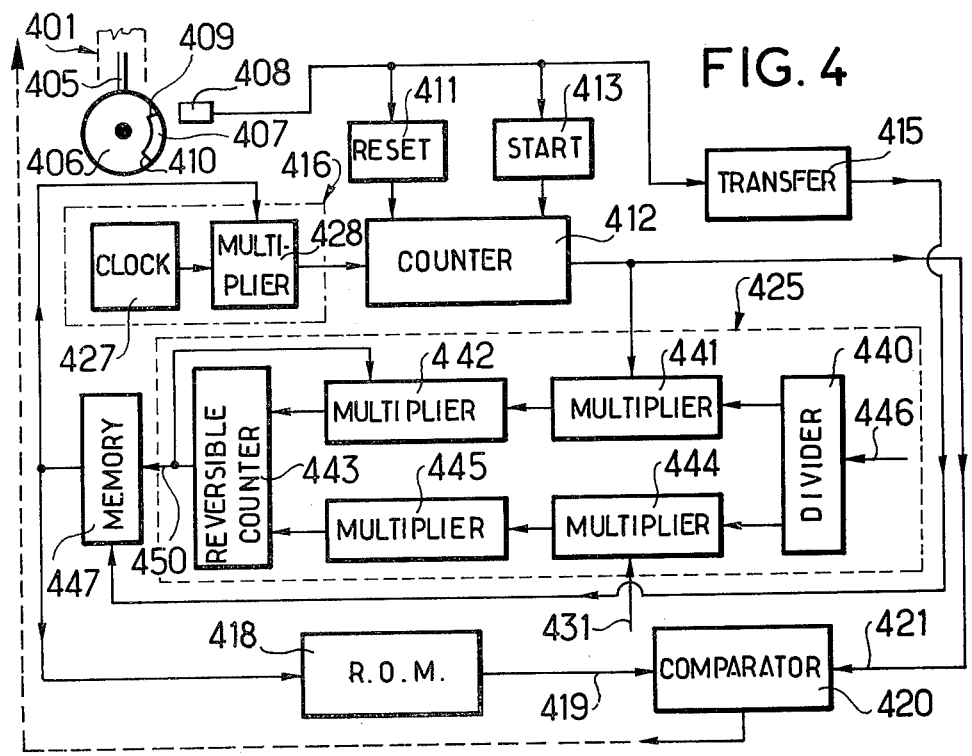

In FIG. 4 is shown only part of the engine, i.e. the connecting rod 405 rotatingly driving the crankshaft 406 which bears a mark 407 delimited by the two ends 409 and 410. The crankshaft moves rotatingly in front of the sensor 408. The sensor and the crankshaft are positioned with respect to each other in the same manner as in the case of the embodiments of the apparatus described earlier. The output of the sensor 408 is also connected to a count stop circuit 413 of the counter 412. The count input of the counter 412 is connected to the output of a controllable-frequency pulse generator. This generator 416 can consist, for example, of a generator 427 delivering fixed-frequency pulses and whose output is connected to the input of a frequency multiplier 428 or possibly of a frequency divider.

The output of the multiplier 428 is connected to the count input of the counter 412. The output of this counter 412 is connected to an input 421 of a binary comparator 420. The output of the counter 412 is connected to a computation element 425 making it possible to carry out a numerical operation in accordance with three parameters. This computation element is for example manufactured and sold by Texas Instruments Incorporated under the designation "BRM Quotient Generator". Thus, an input 431 of this computation element 425 receives a signal corresponding to a constant number M. The computation element delivers at its output 450 a number λ, as defined previously, which is stored in the buffer memory 447. The output of the buffer memory 447 is connected, on the one hand, to the input of the frequency multiplier 428 and, on the other hand, to the input of a permanent memory 418. The output of the permanent memory 418 is connected to the second input 419 of the binary comparator 420.

By way of example, a computation element 425 can consist of a frequency divider/phase-shifter 440 supplied on one input 446 by pulses, at a given frequency, which can be, for example, those delivered by the generator 427. The two outputs of this divider/phase-shifter are connected respectively to frequency multipliers 441 and 444, the frequency multiplier 444 having its input connected to the output of the counter 412. The outputs of the frequency multipliers 441 and 444 are connected respectively to two other frequency multipliers 442 and 445 whose outputs are connected to the two inputs of an add-subtract unit 443 whose output is looped back to the multiplier 442. The signal corresponding to the number M is applied to the input 431 of the frequency multiplier 444.

It is assumed that the value obtained at the output of the add-subtract unit 443 has, after a given measurement cycle, the binary value λ*. During the following measurement obtained when the piston passes again in the cylinder, in the same direction, the content M' of the counter 412 is entered into the frequency multiplier 440 and the computation element 425 makes it possible to carry out the operation of multiplying λ*, which is the content in the add-subtract unit 443, by M, which is the value applied to the input 431 of the multiplier 444, the product of this multiplication being divided by the number M' obtained at the output of the counter 412. The result of these operations then gives the new value of λ which is stored in the buffer memory 447. It is this number λ, corrected at its right value, which serves to determine, with the permanent memory 418, the number N' which allows the control of the ignition. The control for storing the value λ in the buffer memory 447 is obtained on the leading edge of the squarewave signal by means of the transfer circuit 415 whose input is connected to the output of the sensor 408 and whose output is connected to the control input of the buffer memory 447.

Figure 5:
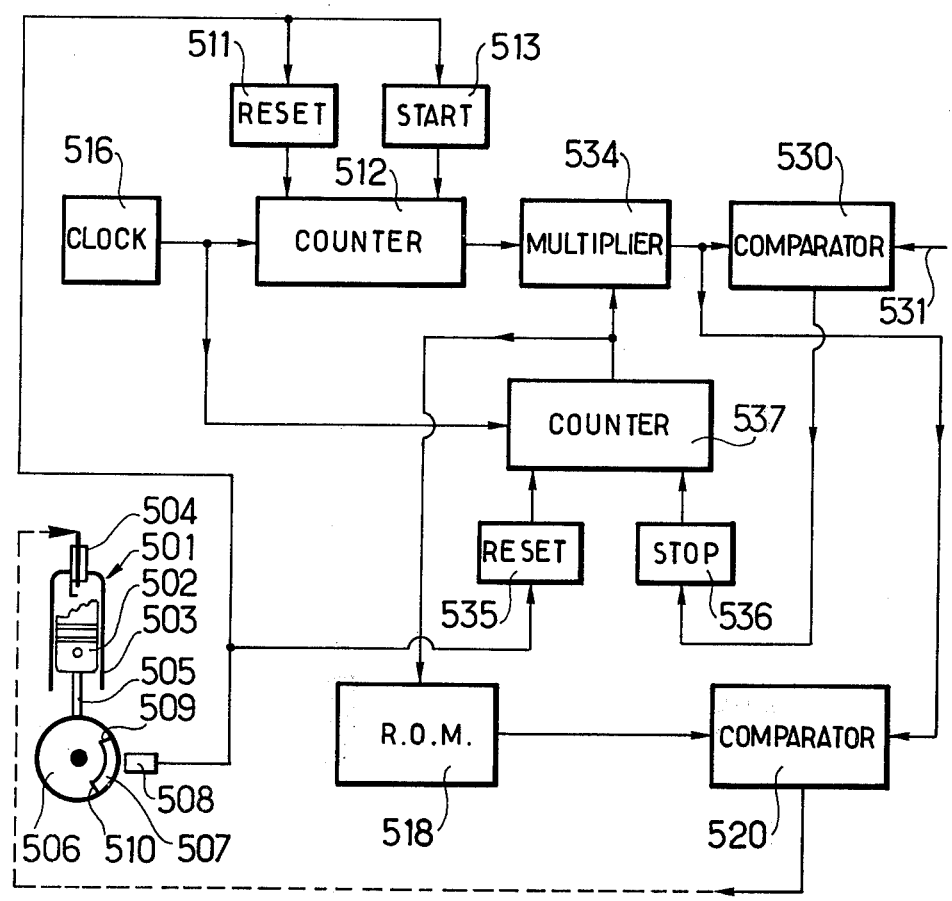

The operation of the apparatus according to FIG. 4 is identical to that of the apparatus according to FIG. 3 except that in this apparatus the number λ is determined in a much more exact manner. In fact, λ = M/M'λ* and, in this case, the variation of λ can be clearly higher than unity. FIG. 5 represents another embodiment of the apparatus allowing the generation of electric pulses for the ignition system of an internal combustion engine. The engine 501 has a piston 502 moving within a cylinder 503 and including a spark plug 504 at its upper part. The piston 502 imparts a rotating movement, by means of a connecting rod 505, to a crankshaft 506 bearing a mark 507 delimited by the ends 509 and 510. The crankshaft 506 is driven rotatingly and moves in front of the sensor 508. The sensor 508 delivers a squarewave signal between the time the ends 509 and 510 pass in front of it. As before, the sensor and the crankshaft are positioned with respect to each other so as to define the two given positions of the piston. The output of the sensor 508 is connected, via a reset circuit 511, to the input of a counter 512. The count input of this counter 512 is connected to the output of a pulse generator 516 delivering constant-frequency pulses. For the counter 512, the count is stopped by the signal delivered by a count stop circuit 513 whose input is connected to the output of the sensor 508 and whose output is connected to the start and stop input of the counter 512. The output of the counter 512 is connected to the input of a multiplier 534. The output of the pulse generator 516 is connected to the input of a counter 537. The reset input of the counter 537 is connected to the output of the sensor 508 via a reset circuit 535. The output of the counter 537 is connected, on the one hand, to the input of the multiplier 534 and, on the other hand, to the input of the permanent memory 518 whose function is identical to those described above. The output of the multiplier 534 is connected to a first input of a binary comparator 530 receiving, on its second input 531, a set-point signal hereinafter designated by the number M. The output of this binary comparator 530 is connected, via a count stop circuit 536, to the count stop input of the counter 537.

The operation of the apparatus according to FIG. 5 is as follows:

When the sensor 508 delivers a squarewave signal, the counter 512 counts pulses whose number is equal to N and is a function of the frequency of the pulses delivered by the generator 516 and of the duration of the squarewave signal delivered by the sensor 508. The counter 537 records the pulses delivered by the generator 516. This number obtained at the output of the counter 537 is multiplied in the multiplier 534 with the number N obtained at the output of the counter 512. As the output of the multiplier 534 is connected to the input of the comparator 530, when the number obtained at the output of the multiplier 534 is equal to the number M, the comparator 530 then delivers a pluse which stops, via the stop circuit 536, the counting of the counter 537. In this counter 537 a number $\lambda$ is then recorded which, multiplied by the number N obtained at the output of the counter 512, gives a product which is equal to the constant number M. As for the preceding apparatus, the number $\lambda$ obtained is inversely proportional to the number N and thus proportional to the engine rotating speed. As in the preceding case with the permanent memory 518, a number N' is generated which corresponds to the firing order for the given speed. This number N' obtained at the output of the memory 518 is applied to an input of the comparator 520. As the other input of this comparator is connected to the output of the multiplier 534, when the signal delivered at the output of this multiplier is equal to the number N', the comparator delivers at its output a signal which then allows the control of the engine ignition system.

It is thus seen that the operation of the embodiment of the apparatus according to FIG. 5 is substantially identical to that of the apparatus according to FIGS. 3 and 4, the difference lying in the means used for generating the number $\lambda$ which is inversely proportional to the number N.

Figure 6:
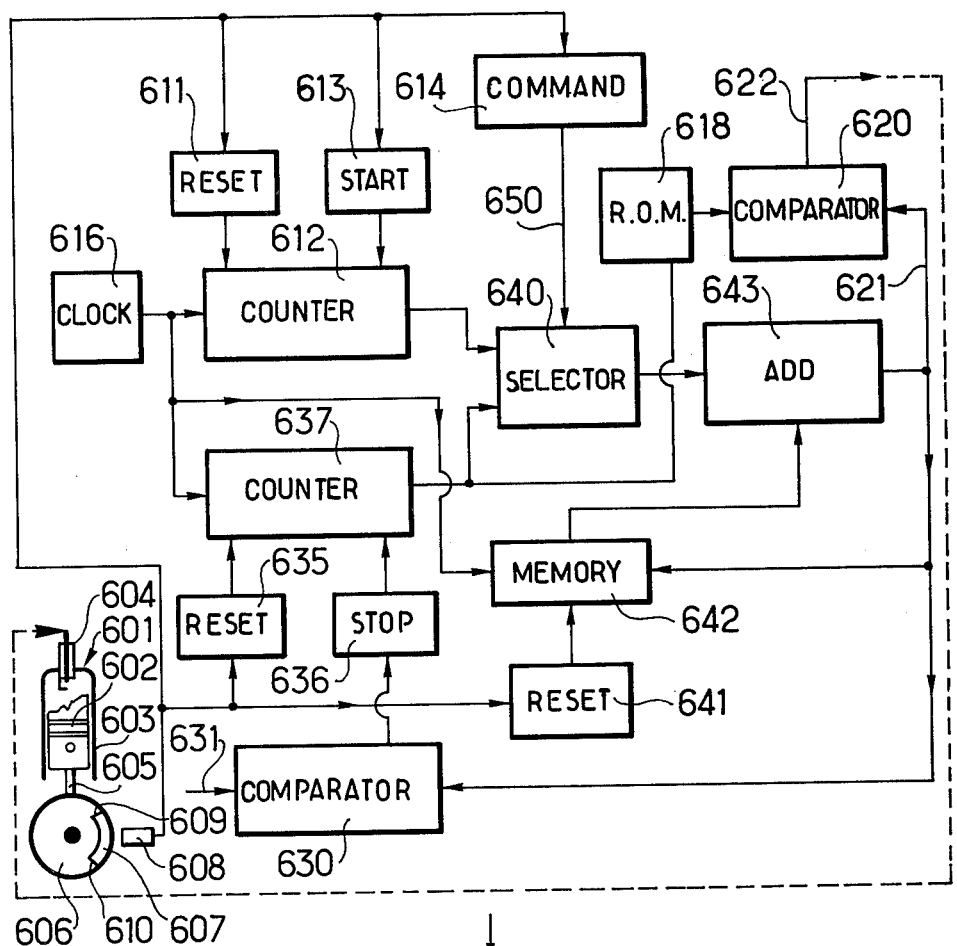

FIG. 6 represents a further embodiment of the apparatus making it possible to generate electric pulses for the ignition system of an internal combustion engine. This embodiment of the apparatus overcomes a drawback of the embodiment according to FIG. 5. In fact, the multiplication which is carried out in the multiplier 534 generally requires a relatively long time and this can be a drawback in particular in the case of high engine speeds when the squarewave signals delivered by the sensor follow each other rapidly, because they then have a very short duration and, throughout their duration, the multiplication of the number N a certain number of times, until N' is obtained cannot be achieved in time.

In the embodiment of the apparatus according to FIG. 6, the above-mentioned drawback is eliminated.

The engine, controlled by the apparatus, includes a piston 602 moving within a cylinder 603 having a spark plug 604 at its upper part. The piston imparts a rotation to a crankshaft 606 bearing a mark 607 delimited by the ends 609 and 610. This crankshaft passes in front of a sensor 608 which delivers a squarewave signal when the mark 607 passes in front of it. As previously, the beginning and the end of the squarewave signal delivered by the sensor 608 correspond to two given positions of the piston 602 in the cylinder 603. The output of the sensor 608 is connected, via a reset circuit 611, to a counter 612 whose count input is connected to a fixed-frequency pulse generator 616. The output of the sensor 608 is also connected, via an end-of-count circuit 613, to the count stop control input of the counter 612. The output of the generator 616 is also connected to the input of a counter 637 whose reset input is connected, via a reset circuit 635, to the output of the sensor 608. The count stop input of this counter 637 is connected, via a stop circuit 636, to the output of a comparator 630 whose first input 631 receives a set-point signal which is determined by the number M. The outputs of the counters 612 and 637 are connected respectively to two inputs of a selector 640. The input 650 of the control of the selector 640 is connected, via a signal selection circuit 614, to the output of the sensor 608. The output of the selector is connected to the input of an adder 643 whose output is connected to a first input 621 of a comparator 620. The output of the counter 637 is also connected to the input of the permanent memory 618 whose output is connected to the input of the comparator 620. The output of the fixed-frequency pulse generator is connected to a transfer memory 642 one input of which is connected to the output of the adder 643 and the other input of which is connected, via a reset circuit 641, to the output of the sensor 608. The output of the adder 643 is also connected to a second input of the comparator 630.

The operation of the embodiment according to FIG. 6 is as follows:

It should first of all be noted that this operation is substantially identical to that of the embodiment of FIG. 5, the only difference being that the multiplication function of this latter embodiment is replaced by an addition function in that of FIG. 6.

When the engine 601 rotates, the sensor 608 delivers a succession of squarewave signals. When the engine has already gone through a certain number of rotations, at the moment of the operation of a squarewave signal delivered by the sensor, the counter 612 is at zero and begins to count the pulses delivered by the generator 616.

The counter 637 is blocked and delivers at its output a signal corresponding to the number $\lambda$. The selector 640 controlled by the selection circuit 614, makes it possible to deliver at its output the signal corresponding to the number λ while it blocks the output of the counter 612.

Throughout the duration of the squarewave signal, the number λ is applied to the input of the adder 643 and the signal obtained at the output of this adder is applied to the input of the transfer memory 642 which records this signal.

Thus, whenever the pulse generator 616, whose output is connected to the control input of the transfer memory, delivers a pulse, the content of this memory is re-added to the number obtained at the input of the adder 643. Thus, to each pulse delivered by the generator 616 is added the number λ. When the number λ has been added a number of times equal to $N'/λ$, the output of the adder which is connected to the input 621 of the comparator 620 delivers a number equal to N' which is that obtained at the output of the permanent memory 618. The comparator 620 then delivers the ignition pulse allowing the control of the engine ignition system. Throughout the duration of this squarewave signal, the counter 612 has recorded a number N of pulses delivered by the generator 616 and this new number N obtained at the output of the counter 612 makes it possible to determine the new number λ which will enable the number N' to be obtained for the control of the engine ignition for the following squarewave signal. This determination of the number λ is done between two squarewave signals which are preferably successive.

At the end of a squarewave signal delivered by the sensor 608, the selector 640 makes it possible to obtain at its output the signal corresponding to the value of the number N obtained at the output of the counter 612 and to block the signal obtained at the output of the counter 637. At the end of a squarewave signal, the counter 637 is reset and begins to count again the pulses delivered by the generator 616. With each pulse delivered by the generator 616, the transfer memory 642 which has been reset by the reset circuit 641 makes it possible to transfer the signal obtained at the output of the adder 643 into this same adder, but adding each time the number N obtained at the output of the selector 640. To each pulse delivered by the generator 616 is successively added the number N, and when the signal obtained at the output of the adder 643 has reached the set-point value representing the number M set at the input 631 of the comparator 630, the latter delivers a signal which, applied to the counter 637 via the stop circuit 636, stops the counting in the counter 637.

The number of pulses then recorded in the counter 637 represents the number of times it was necessary to add a number N to obtain the number M, i.e. the number λ sought, or in other words $λ N = M$. As previously, this number λ, substantially equal to $M/N$, is inversely proportional to N and hence proportional to the engine rotating speed.

The embodiments shown in FIGS. 3 to 6 all have an advantage over the embodiment illustrated in FIG. 2.

Figure 7:
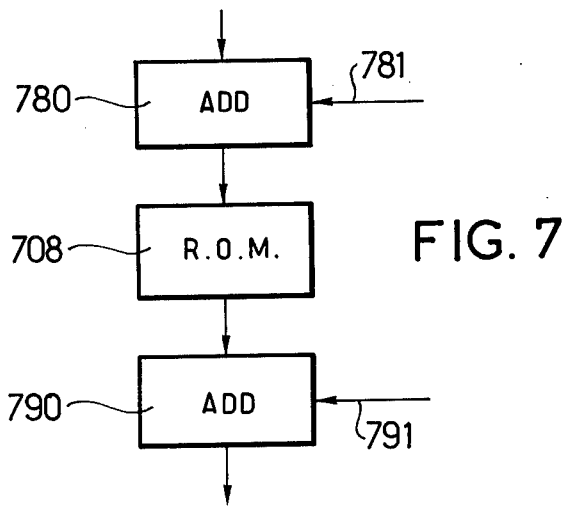
FIG. 7 represents part of an embodiment of apparatus according to the invention.

In all these embodiments, in which one determines a value λ in binary notation proportional to the engine rotating speed, it is easy to vary the firing order in one direction or the other in accordance with the speed. Since λ is proportional to the engine rotating speed, it is sufficient, for example, as illustrated in FIG. 7 to place, for example between the output of the means making it possible to deliver the value of λ and the permanent memory 708, an adder 780, in the algebraic sense of the word, which enables, as desired and in accordance with a number set at the input 781 of the adder 780, the positive or negative shifting of the value of the number λ.

In all the embodiments represented in FIGS. 3 to 6 there is also the possibility of varying the moment of ignition as desired. In fact, the number N' delivered by the permanent memory is a function representative of the position of the piston in the cylinder when the ignition is to take place. If it is desired that the ignition take place before the piston reaches this position or after the piston has passed this position, it is sufficient to place at the output of the permanent memory 708, before the input of the binary comparator which is generally connected to the output of this memory, an adder 790, in the algebraic sense of the term, which makes it possible, in accordance with a number set at the input 791 of the adder 790, to vary the value of N' positively or negatively and thereby obtain earlier or slightly later ignition.

We claim:
1. An electronic circuit for controlling the ignition means of an internal combustion engine having at least one piston and marker means indicative of a first and a second position of said piston, comprising:
   sensor means responsive to said marker means for producing a first and second signal corresponding respectively to the first and the second position;
   means responsive to said first and second signal for generating a number N proportional to the time interval separating said first signal from said second signal;
   inverting means for producing a number λ inversely proportional to the number N, the number λ being proportional to the speed of said piston between said first and second position for one cycle of said piston;
   means responsive to the number λ generated by said inverting means for producing a number N' preselected as a function of the value of λ;
   means for generating a number M' equal to the product λN; and
   means for comparing the number N' with the number M', said comparing means delivering an ignition signal when the number M' is substantially equal to the number N'.

2. The circuit of claim 1 wherein said sensor means comprise:
   a sensor delivering a squarewave signal when the piston moves between said first and second position, this first signal product by said sensor means being the leading edge of said squarewave signal and the second signal being the trailing edge of said squarewave signal;
   means responsive to said leading edge of the squarewave signal for resetting and starting said counting means; and
   means responsive to said trailing edge of the squarewave signal for stopping said counting means.

3. The circuit of claim 2 wherein said means for generating the number N comprise:
   a generator delivering clock pulses; and
   a first counter for counting signals representative of the clock pulses during said time interval delimited by the first and second signal.

4. The circuit of claim 3 wherein the input of said first counter is directly connected to the output of said generator, said first counter counting the clock pulses, and wherein said inverting means for producing the number λ comprise:
- a comparator comparing a set-point number M with the number M' and delivering an output signal when M' becomes equal to M;
- a second counter counting the clock pulses emitted by said generator;
- means responsive to the leading edge of said squarewave signal for resetting and starting said second counter; and
- means responsive to said comparator output signal for stopping said second counter, the resulting count of said second counter being representative of the number λ.

5. The circuit of claim 4 wherein said means for generating a number M' equal to the product λN comprise a multiplier receiving on one input a signal representative of the number N delivered by said first counter and on another input a signal representative of the number λ delivered by said second counter.

6. The circuit of claim 4 wherein said means for generating a number M' equal to the product λN comprise means for summing the successive values of the number λ delivered by said second counter each time said first counter counts one of said clock pulses during said time interval delimited by the leading and trailing edge of the squarewave signal.

7. The circuit of claim 6 wherein said summing means comprise a summing circuit delivering said number M' for summing one value of λ to the sum of the preceding values of λ; a memory controlled by the clock pulses for memorizing said sum of the preceding values and for supplying said sum to said summing circuit; and means for resetting said memory by said leading edge of said squarewave signal.

8. The circuit of claim 3 wherein said means for generating the number M' equal to the product λN comprise a multiplier having one input connected to the output of said generator and its output connected to the input of said first counter and wherein said inverting means for producing the number λ comprise:
- an add/subtract unit having an output connected to the other input of said multiplier; and
- a comparator comparing a set-point number M with the number M' supplied by said first counter, said comparator delivering an input signal to said add/subtract unit when the value of M' is different from the value of M.

9. The circuit of claim 3 wherein said means for generating the number M' equal to the product λN comprise a multiplier having one input connected to the output of said generator and its output connected to the input of said first counter and wherein said inverting means for producing the number λ comprise:
- dividing means for dividing a set-point number M by the number of pulses counted in said first counter during the squarewave signal;
- multiplication means for multiplying the result delivered by said dividing means by a number λ' stored in memory, the number λ' corresponding to the number λ generated during the preceding squarewave signal;
- a memory for recording the result given by said multiplication means and for supplying said result to the other input of said multiplier; and
- control means responsive to said squarewave signal for actuating the input of said memory to record said result.

10. An electronic ignition system for producing ignition signals comprising in combination with an internal combustion engine having at least one piston imparting rotatable motion to a crankshaft and ignition means triggered by said ignition signals,
- marker means indicative of a first and a second position of said piston;
- sensor means responsive to said marker means for producing a first and second signal corresponding respectively to the first and the second position;
- means responsive to said first and second signal for generating a number N proportional to the time interval separating said first signal from said second signal;
- inverting means for producing a number λ inversely proportional to the number N, the number λ being proportional to the speed of said piston between said first and second positions for one cycle of said piston;
- means responsive to the number λ generated by said inverting means for producing a number N' preselected as a function of the value of λ;
- means for generating a number M' equal to the product λN; and
- means for comparing the number N' with the number M', said comparing means delivering an ignition signal to said ignition means when the number M' is substantially equal to the number N'.

11. The system of claim 10 and wherein said sensor means comprise:
- a sensor delivering a squarewave signal when the piston moves between said first and second positions, the first signal produced by said sensor means being the leading edge of said squarewave signal and the second signal being the trailing edge of said squarewave signal;
- means responsive to said leading edge of the squarewave signal for resetting and starting said counting means; and
- means responsive to said trailing edge of the squarewave signal for stopping said counting means.

12. The system of claim 11 wherein said means for generating the number N comprise:
- a generator delivering clock pulses; and
- a first counter for counting signals representative of the clock pulses during said time interval delimited by the first and second signal, the resulting count corresponding to the number N.

13. The system of claim 12 wherein the input of said first counter is directly connected to the output of said generator, said first counter counting the clock pulses, and wherein said inverting means for producing the number λ comprise:
- a comparator comparing a set-point number M with the number M' and delivering an output signal when M' becomes equal to M;
- a second counter counting the clock pulses emitted by said generator;
- means responsive to the leading edge of said squarewave signal for resetting and starting said second counter; and
- means responsive to said comparator output signal for stopping said second counter, the resulting count of said counter being representative of the number λ.

14. The system of claim 13 wherein said means for generating a number M' equal to the product λN comprise a multiplier receiving on one input a signal representative of the number N delivered by said first counter and on another input a signal representative of the number λ delivered by said second counter.

15. The system of claim 13 wherein said means for generating a number M' equal to the product λN comprise means for summing the successive values of the number λ delivered by said second counter each time said first counter counts one of said clock pulses during said time interval delimited by the leading and trailing edge of the squarewave signal.

16. The system of claim 15 wherein said summing means comprise a summing circuit delivering said number M' for summing one value of λ to the sum of the preceding values of λ; a memory controlled by the clock pulses for memorizing said sum of the preceding values and for supplying said sum to said summing circuit; and means for resetting said memory by said leading edge of said squarewave signal.

17. The system of claim 12 wherein said means for generating the number M' equal to the product λN comprise a multiplier having one input connected to the output of said generator and its output connected to the input of said first counter and wherein said inverting means for producing the number λ comprise:
an add/subtract unit having an output connected to the other input of said multiplier; and
a comparator comparing a set-point number M with the number M' supplied by said first counter, said comparator delivering an input signal to said add/subtract unit when the value of M' is different from the value of M.

18. The system of claim 12 wherein said means for generating the number M' equal to the product λN comprise a multiplier having one input connected to the output of said generator and its output connected to the input of said first counter and wherein said inverting means for producing the number λ comprise:
dividing means for dividing a set-point number M by the number of pulses counted in said first counter during the squarewave signal;
multiplication means for multiplying the result delivered by said dividing means by a number λ' stored in memory, the number λ' corresponding to the number λ generated during the preceding squarewave signal;
a memory for recording the result given by said multiplication means and for supplying said result to the other input of said multiplier; and
control means responsive to said squarewave signal for actuating the input of said memory to record said result.

19. The system of claim 10 wherein said marker means is a continuous mark having two ends corresponding respectively to said first and second positions of said piston, said first signal being produced when one end of said mark is detected by said sensor and said second signal being produced when the other end of said mark is detected by said sensor.

* * * * *